(12) United States Patent
Boeckeler et al.

(10) Patent No.: US 11,095,447 B2
(45) Date of Patent: Aug. 17, 2021

(54) METHOD FOR USING CRYPTOGRAPHY AND AUTHENTICATION METHODS AND SYSTEMS FOR CARRYING OUT SAID METHOD

(71) Applicant: SECUNET SECURITY NETWORKS AG, Essen (DE)

(72) Inventors: Gregor Boeckeler, Unterhaching (DE); Niels Cölle, Poing (DE); Thomas Maier, Vaterstetten (DE); Michael Stoll, Munich (DE); Johannes Schäffner, Munich (DE); Stephan Wehr, Gauting (DE)

(73) Assignee: SECUNET SECURITY NETWORKS AG, Essen (DE)

(*) Notice: Subject to any disclaimer, the term of this patent is extended or adjusted under 35 U.S.C. 154(b) by 344 days.

(21) Appl. No.: 16/076,802

(22) PCT Filed: Feb. 7, 2017

(86) PCT No.: PCT/EP2017/052590
§ 371 (c)(1),
(2) Date: Aug. 9, 2018

(87) PCT Pub. No.: WO2017/137370
PCT Pub. Date: Aug. 17, 2017

(65) Prior Publication Data
US 2019/0020484 A1 Jan. 17, 2019

(30) Foreign Application Priority Data
Feb. 9, 2016 (EP) .................... 16154824

(51) Int. Cl.
*H04L 29/06* (2006.01)
*H04L 9/32* (2006.01)
*H04L 9/08* (2006.01)

(52) U.S. Cl.
CPC .......... *H04L 9/3234* (2013.01); *H04L 9/0866* (2013.01); *H04L 9/0877* (2013.01);
(Continued)

(58) Field of Classification Search
CPC ... H04L 9/3234; H04L 9/0866; H04L 9/0877; H04L 9/3247; H04L 63/0807; H04L 63/0853
See application file for complete search history.

(56) References Cited

U.S. PATENT DOCUMENTS 6,446,204 B1   9/2002 Pang et al.
7,320,024 B2   1/2008 Oku
(Continued)

FOREIGN PATENT DOCUMENTS

CN   101409721 A   4/2009
CN   101822082 A   9/2010
(Continued)

OTHER PUBLICATIONS

Pascal Urien et al: "A new cooperative architecture for sharing services managed by secure elements controlled by android phones with IP objects" IEEE International Conference on Collaboration Technologies and Systems (CTS) pp. 404-409 (2012).
(Continued)

*Primary Examiner* — Ghodrat Jamshidi
(74) *Attorney, Agent, or Firm* — 24IP Law Group USA, PLLC; Timothy Dewitt (57) ABSTRACT

The invention relates to a method to initiate the use of cryptography and authentication methods and to perform these methods. The method comprises the steps of: generating a URI (410), calling (420) a communication component (120) using the generated URI and a proprietary URI scheme; performing (430) the cryptography and authentication method by the local communication component (120);
(Continued)

generating (440) at least one result (440) by the communication component (120).

9 Claims, 8 Drawing Sheets

(52) U.S. Cl.
CPC ........ *H04L 9/3247* (2013.01); *H04L 63/0807* (2013.01); *H04L 63/0853* (2013.01)

(56) References Cited

U.S. PATENT DOCUMENTS

| | | | | |
|---|---|---|---|---|
| 8,544,072 B1* | 9/2013 | Masone | .............. | H04L 63/0815 726/6 |
| 8,769,651 B2 | 7/2014 | Grajek | | |
| 2001/0034771 A1* | 10/2001 | Hutsch | .............. | H04L 29/12047 709/217 |
| 2002/0128981 A1 | 9/2002 | Kawan et al. | | |
| 2007/0260886 A1* | 11/2007 | Dufour | .............. | G06K 9/00885 713/186 |
| 2008/0244712 A1* | 10/2008 | Kitada | .................... | G06F 21/41 726/5 |
| 2011/0179113 A1* | 7/2011 | Thomas | .............. | G06Q 20/0655 709/203 |
| 2013/0007846 A1* | 1/2013 | Murakami | ........ | H04W 12/0431 726/4 |
| 2013/0067568 A1* | 3/2013 | Obasanjo | .............. | H04L 63/101 726/20 |
| 2014/0025519 A1* | 1/2014 | Thomas | .................. | H04L 51/16 705/21 |
| 2014/0040876 A1* | 2/2014 | Morley | ................. | G06F 21/125 717/172 |
| 2014/0189790 A1* | 7/2014 | Mindler | .................. | H04L 65/80 726/3 |
| 2014/0344575 A1* | 11/2014 | Saremi | .................. | H04L 63/061 713/168 |
| 2014/0357187 A1* | 12/2014 | Ehrensvard | ........... | H04L 63/123 455/41.1 |
| 2015/0032578 A1* | 1/2015 | Bicer | ...................... | H04L 63/18 705/26.82 |
| 2015/0046848 A1* | 2/2015 | Vohra | ................ | H04M 1/72522 715/760 |
| 2015/0170388 A1* | 6/2015 | Chawathe | ............... | G06T 11/60 345/629 |
| 2015/0220943 A1* | 8/2015 | Dossick | .............. | H04L 61/6009 705/7.29 |
| 2015/0289135 A1 | 10/2015 | Berard et al. | | |
| 2015/0363771 A1* | 12/2015 | Graylin | .................. | G06Q 20/12 705/65 |
| 2016/0366119 A1* | 12/2016 | Rykowski | ............... | G06F 21/44 |

FOREIGN PATENT DOCUMENTS

| | | |
|---|---|---|
| CN | 101953187 A | 1/2011 |
| CN | 104361130 A | 2/2015 |
| CN | 105071922 A | 11/2015 |
| DE | 102 23 551 | 12/2003 |
| EP | 2018064 A2 | 1/2009 |
| EP | 2 296 337 A1 | 3/2011 |
| EP | 2299747 A2 | 3/2011 |
| WO | 2009/046400 A1 | 4/2009 |
| WO | 2010/132458 A2 | 11/2010 |

OTHER PUBLICATIONS

Aissaoui-Mehrez Hassane et al: "Framework implementation based on grid of smartcards to authenticate users and virtual machines" 2014 11th International Conference on Security and Cryptography (SECRYPT).

* cited by examiner

METHOD FOR USING CRYPTOGRAPHY AND AUTHENTICATION METHODS AND SYSTEMS FOR CARRYING OUT SAID METHOD

CROSS REFERENCE TO OTHER APPLICATIONS

This application claims the priority of and benefit to European Patent Application filed on 9 Feb. 2016 entitled EP16154824.3 and is a national phase entry of International Patent Application No. PCT/EP2017/052590 filed on 7 Feb. 2017. The entire contents of the aforementioned applications are incorporated herein by reference.

BACKGROUND OF THE INVENTION

Field of the Invention

The invention relates to a method for communication between components to initiate the use of cryptography and authentication methods and to perform these methods.

Brief Description of the Related Art

Access to cryptography or other components used for authentication purposes (e.g. smart cards, USB tokens or hardware for detecting biometric identification features, such as fingerprints or iris scans) from an environment restricted for security reasons, such as that of a browser (e.g. in the context of using web services), has so far been implemented via application-specific interfaces (e.g. browser plug-ins) or via so-called NPAPI interfaces (e.g. Java, PKCS #11, . . . ). These interfaces are being shut down in modern browsers due to security concerns and will therefore be no longer available in the future. In addition, plug-ins that implement these or similar API interfaces must be implemented and made available on a platform-specific and application-specific basis, resulting in a high maintenance effort.

Another current approach is the use of a local webserver running as a service in the background and addressable via the localhost or loopback address of the computer. Disadvantages of this approach are an increased consumption in resources, as the service has to run continuously in the background, as well as other security-relevant points of attack which are inherent to a service constantly running in the background. In addition, the use of a local webserver is only partially suitable for application in virtualized environments and in the remote desktop and terminal server services settings. An example is known from the publication by Pascal Urien et al. "A new cooperative architecture for sharing services managed by secure devices controlled by android phones with IP objects", 2012 IEEE International Conference on Collaboration Technologies and Systems, 21 May 2012, pages 404-409 DOI: 10.1109/CTS.2012.6261084.

Various patent applications or patents are known in the prior art which describe cryptography and authentication procedures. This prior art discloses new protocols or modifications of known protocols as well as special cryptographic methods which require a specific environment.

For example, German Patent Application DE 102 23 551 (Siemens AG) discloses a data communication system with various clients being able to access a computer program. In the disclosed data communication system, a client is only authenticated to access the data for a certain period of time. After this period, the client must be re-authenticated.

European patent application no. EP 2 296 337 A1 (Gemalto) discloses a method for protecting the access of data. The data can only be accessed via a unique ("one-time") Uniform Resource Locator (URL). This unique URL is generated using an address and a shared secret value.

U.S. Pat. No. 6,446,204 B1 (Argo) discloses a method and a system for realizing an authentication method in a web server. In this patent, the authentication method is performed via a plurality of independent servers.

U.S. Pat. No. 7,320,024 B2 discloses a system for providing content from a web server having an authentication server. The web server provides the content to a user after entering a user identifier (identifier).

From U.S. Pat. No. 8,769,651 B2 (SecureAuth) a system fora mobile device is known which stores a token which is stored on the mobile device after an authentication procedure has been performed.

International Patent Application WO 2010/132458 A2 (Microsoft) discloses a so-called challenge for authentication of access rights.

SUMMARY OF THE INVENTION

A method for communication of components to initiate cryptography and authentication methods (e.g., to create a signature, encrypt/decrypt data or authenticate a person) and to perform these methods is described. The procedure includes the following steps:

Generating a URI (Uniform Resource Identifier), calling a communication component by means of the generated URI and a proprietary URI scheme; performing the cryptographic and authentication method by the communication component; and generating at least one result by the communication component.

The proprietary URI scheme for calling the communication component is previously registered in the system.

To carry out the cryptography and authentication method, the communication component can access a security device. For example, the security device is a Bluetooth device, a smart card, a USB stick, a data medium or a device for detecting biometric features.

In another aspect, the method includes requesting an identifier by the communication component prior to performing the cryptography and/or authentication method. The identifier is, for example, a password, a PIN code, or the like, and may also be a precondition for accessing the security device.

The URI can also be generated on an external computer and transferred from the external computer to the local application.

The result generated may be returned to the local application and forwarded from the local application to an external computer, or transferred directly from the communication component to an external computer.

The generated result can also be processed by a management application, whereby the external application only has to initiate the entire process (the authentication of a user, for example) and evaluate the response from the management application. The remaining steps and details of the overall process are therefore transparent to the external application.

The result generated by the communication component is, for example, a data signature, or the result is encrypted or decrypted data.

A local unit is also described, which comprises a processor having a local application and a local communication component, which registers a proprietary URI scheme. The local unit also has a network interface for connecting the local unit to an external computer, the network interface transferring commands for starting an external application and receiving parameters from the external application.

The local application can call the communications components via the self-registered (proprietary) URI scheme by means of a generated URI. The communication component can establish a contact with a security device and transfer a result to the external computer.

By using this method, risks are mitigated and potential points of attack are avoided, since no browser-specific extensions or local server applications (with access via loopback or network adapters) have to be installed and/or used. In addition, the method is more sustainable because preconditions for previously used methods (such as plug-in interfaces) are dependent on the particular implementations and update cycles (e.g., browsers), which is not the case with the method described herein.

BRIEF DESCRIPTION OF THE DRAWINGS

Further features and advantages of the invention will become apparent from the following, purely exemplary and in no way limiting description of preferred embodiments of the invention with reference to the accompanying drawings. In the drawings.

DETAILED DESCRIPTION OF THE INVENTION

It will be apparent to a person of ordinary skill in the art of cryptography and authentication that the following description of the embodiments and aspects of the invention are solely provided for illustrative purposes and not for the purpose of limiting the invention defined by the appended claims and their equivalents.

Figure 1A:
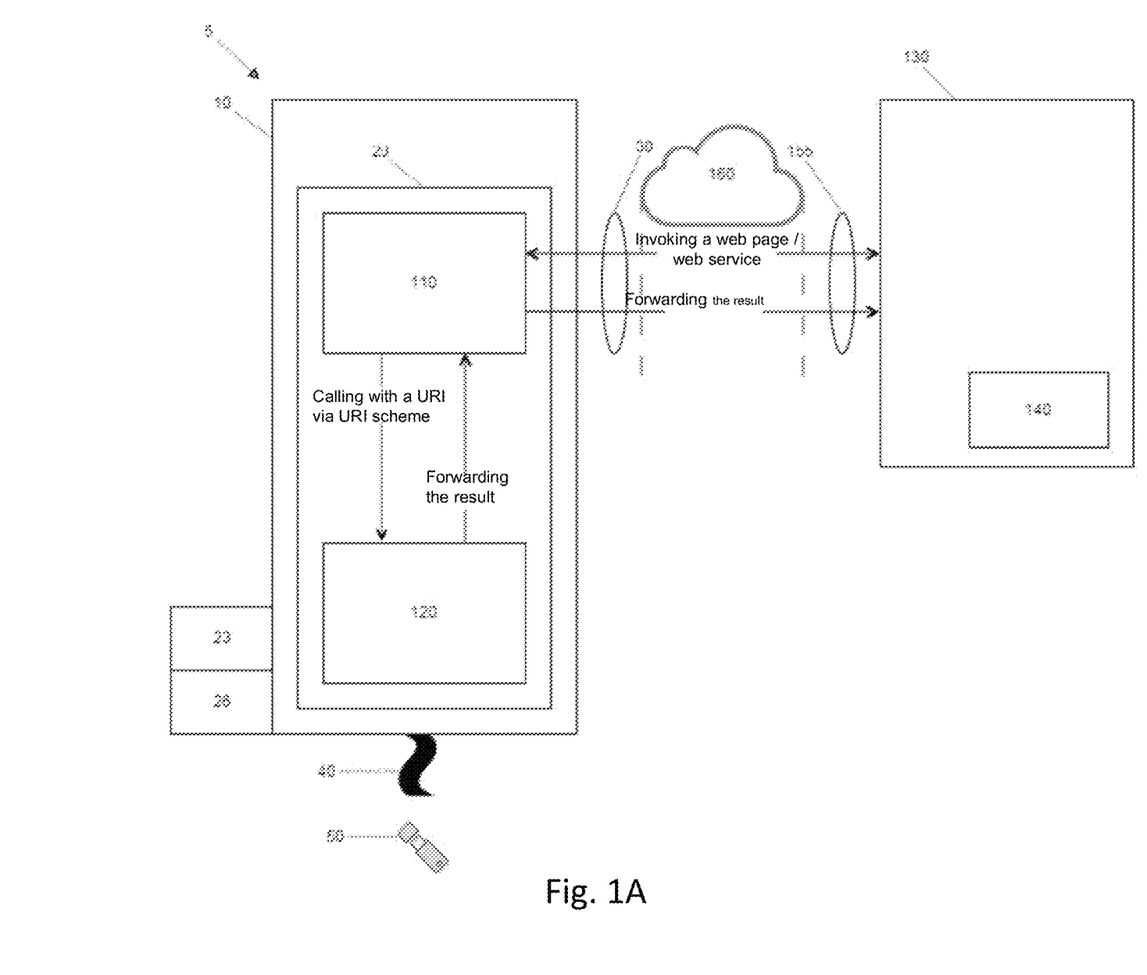
FIG. 1A shows schematically a system having an access to an external security device.

Initially with reference to FIG. 1A, a system 5 for accessing an external application 140 on an external computer 130 is schematically illustrated. The system 5 comprises a local unit 10 having a processor 20, possibly a graphics card 23 and a storage space 26. Programs for generating a local application 110 and a communication component 120 run on the processor 20. The local application 110 is, for instance, a browser. The local unit 10 is, for example, a PC, a tablet PC or a smartphone.

The local unit 10 also has a network interface 30 and a security interface 40. The network interface 30 is connected via a network 160 with the Internet or an intranet or extranet to the external computer 130, such as a webserver.

The security interface 40 is physically connected to a security device 50, such as a USB stick, a chip card reader or a data medium. Likewise, the security interface 40 can be a radio interface that can be in contact with a security device 50, for example, via NFC (Near Field Communication) or Bluetooth. The security device 50 may also be a device for detecting biometric identifiers, such as fingerprints or iris scans. In addition, multiple security interfaces 40 and/or security devices 50 may be provided. The access to the security device 50 may be dependent on the request by the communication component 120 and the correct entry of an identifier.

The external computer 130 is also connected via a server interface 155 to the Internet 160 or to an extranet or intranet. In the illustrated example, the external computer 130 has an external application 140, also referred to as application program, which runs on the external computer 130.

Figure 6:
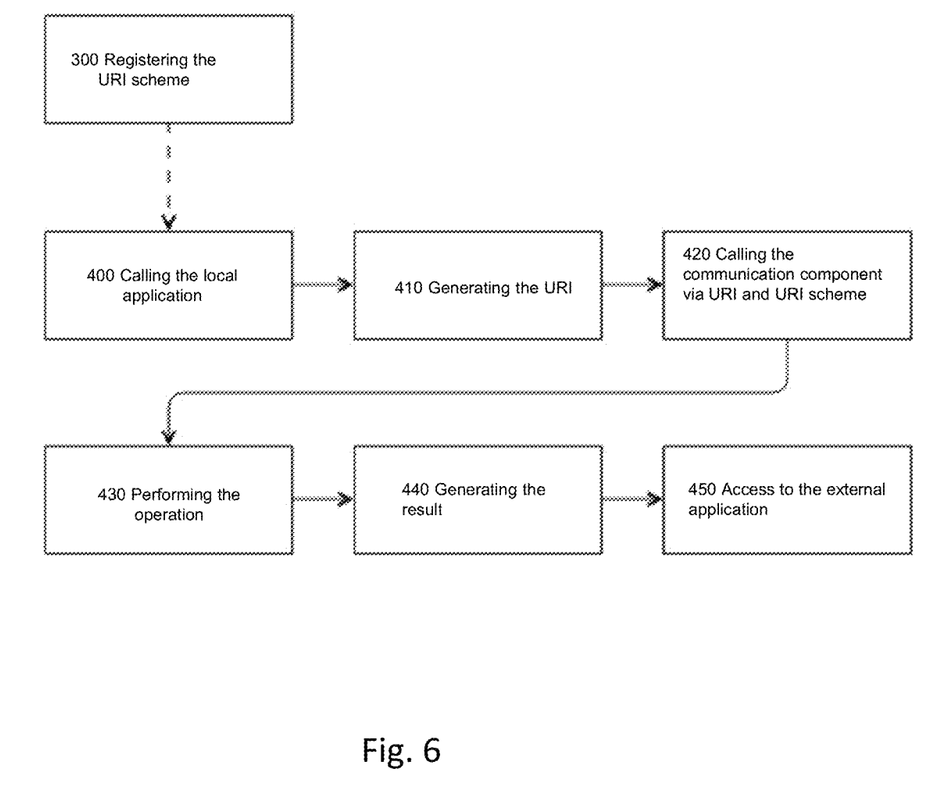
FIG. 6 shows the sequence of the method.

The sequence of the method will now be described with reference to FIG. 6.

In a first registration step 300, a proprietary URI scheme is registered. This first step may be performed during the installation of the communication component 120 both once and multiple times, for instance, with every update. This registration step 300 may also be performed every time the local unit 10 is activated or started.

In a following step 400, the local application 110 is invoked on the local unit 10. This following step 400 is temporally downstream of the registration step 300 and is context-independent. The local application 110 wants to access an application 140 on the external computer 130. This access is granted only after successful authentication. To perform this authentication, a URI (Uniform Resource Identifier) is generated in the next step 410.

A non-limiting example of an access is invoking a web page on the external computer 130. In this case, the user will enter an IP address or a URL in a browser line in a browser (the local application 110). This entry in the browser line points to the application 140 on the external server 130. Since the application 140 requires authentication prior to an access, it transfers necessary parameters to the browser (the local application 110). The local application 110 generates a URI based on the transferred parameters. Alternatively, the URI can also be generated on the external computer and transferred with or instead of the parameters to the local application 110.

A Uniform Resource Identifier (URI) is an identifier that identifies a resource on a local machine or on an external computer and is specified in RFC 3986 of the W3C Consortium. According to RFC 3986, the URI consists of a string with a scheme, a provider (authority), a path, a query, and a fragment, the latter four taken together, are hereinafter referred to as the actual useful data of a URI. An example of the generated URI is as follows: secunet: secunet:// auth?Protocol=secunet& TokenType=USBStick&Challenge=A7B93985

By means of the proprietary URI scheme registered in step 300 and the URI previously generated in step 410, the communication component 120 is called in step 420. The communication component 120 acquires the useful data from the generated URI and performs an operation in step 430. This operation is a cryptographic or authentication method and typically includes access to the security device 50. If multiple security devices 50 are present, the user is prompted to select the security device 50 to be used.

In step 440, at least one result is generated by the communication component 120 and subsequently transferred to the local application 110. The local application 10 further transfers the result to the external application 140. If the result is correct, the local application 110 subsequently receives access to the application 140 in step 450.

Figure 1B:
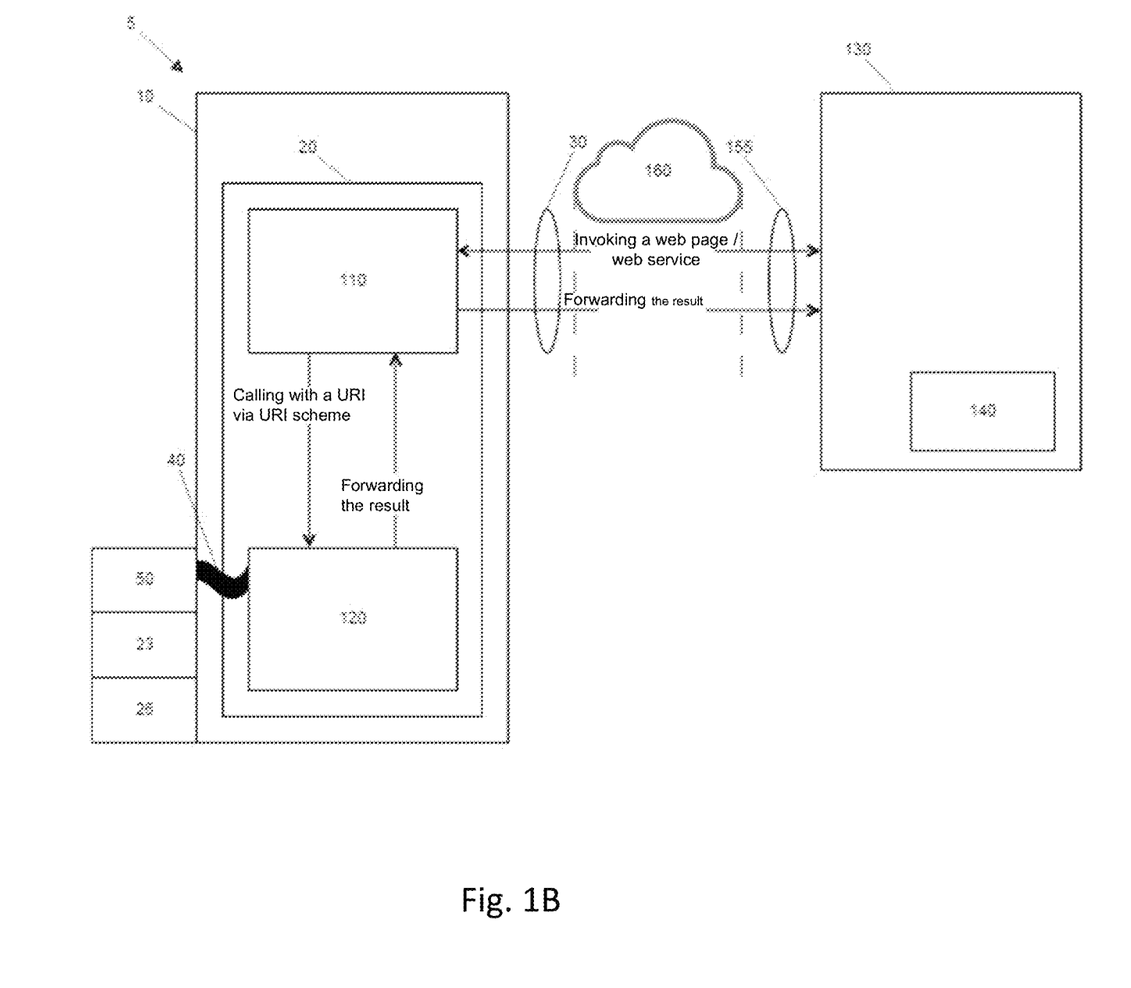
FIG. 1B shows schematically a system with access to a security device, which itself is part of the local unit.

FIG. 1B shows another aspect of the method. The individual elements in FIG. 1B are largely identical to the elements of FIG. 1A and thus have the same reference numerals. In this aspect, the security device 50 is a fixed constituent of the local unit 10, such as a secure-element chip or hardware-based encryption. The security device 50 may also be implemented in software.

Figure 2:
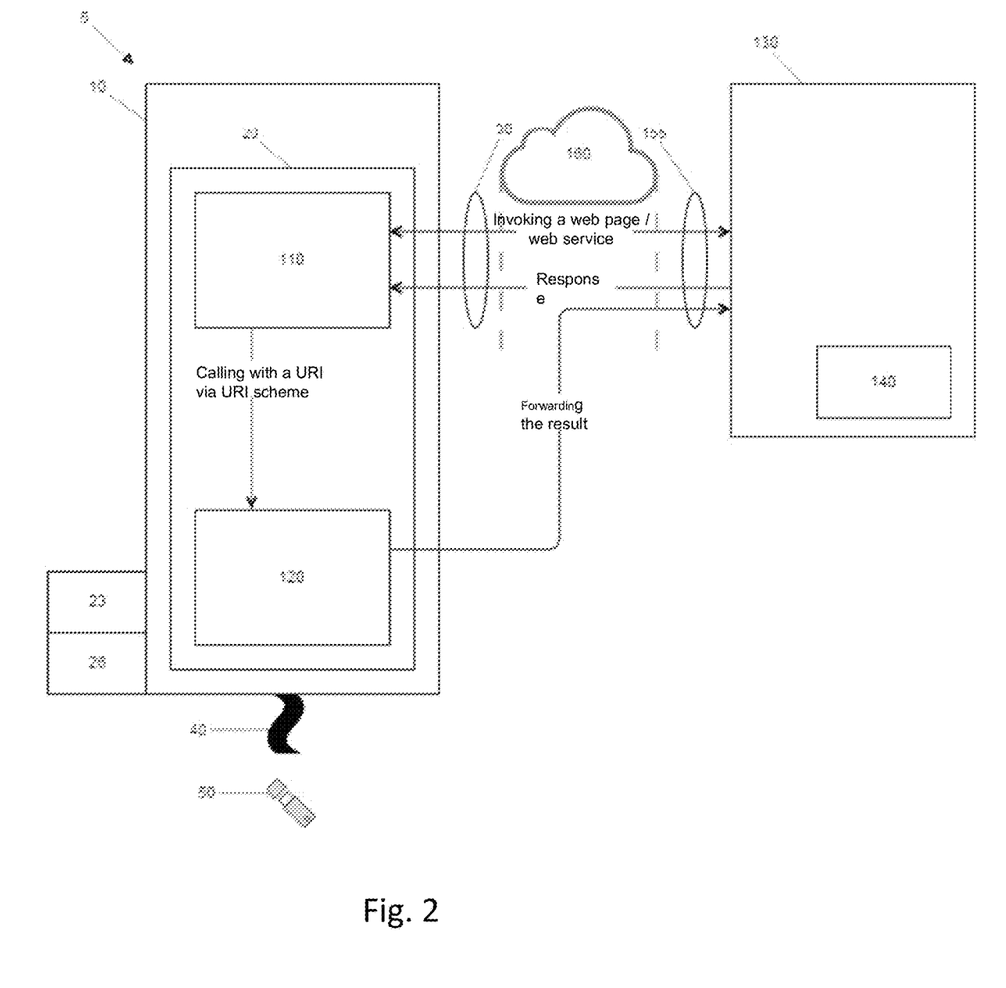
FIG. 2 shows schematically a system having an access to a security device with direct forwarding of the result to the external computer.

FIG. 2 shows a third aspect of the method. In this third aspect of the method, the communication component 120 on the local unit 10 returns the result directly to the external computer 130. After validation of the result by the external computer 130, the external computer 130 sends a response to the local application 110. The response may be displayed in the local application 110.

Figure 3A:
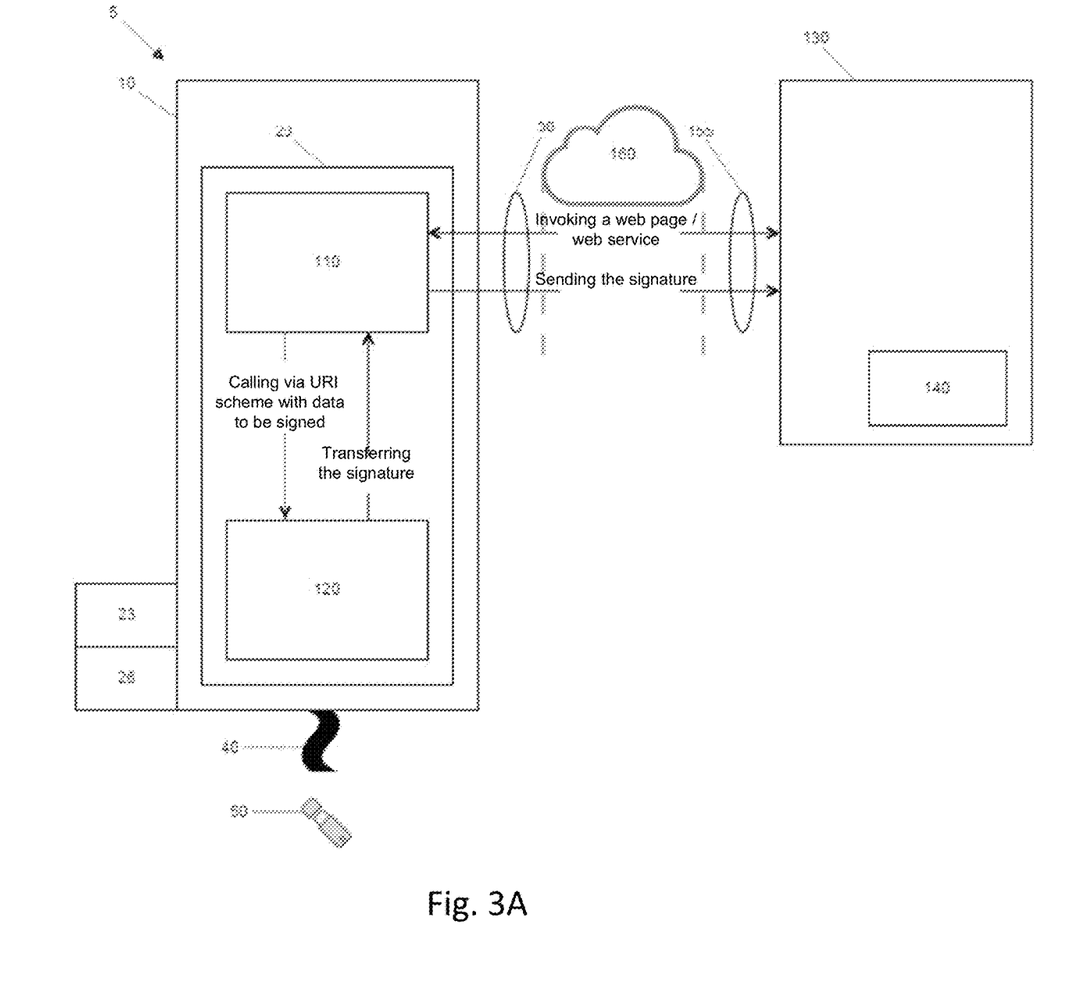
FIG. 3A shows schematically a system having an access to a security device with processing of data to be signed.

FIG. 3A shows a further aspect of the method in which the local application 110 transfers data, which are to be signed, about its proprietary URI scheme. The transfer of the data can be carried out directly, i.e. the proprietary URI scheme contains the data itself, or indirectly, for example by reference to a file containing this data.

The communication component 120 then provides the user with a selection of the available security devices 50 assisting in the operation to generate a signature. The user then selects the security device 50 to be used, and the communication component 120 uses the selected security device 50 to generate the signature from the data to be signed. The result generated by the communication component 120, which contains the signature of the data to be signed, is subsequently transferred to the local application 110. The local application 110 may forward the signed data, i.e. the signature and data or only the signature, to the external computer 130 and thus to the external application 140.

Figure 3B:
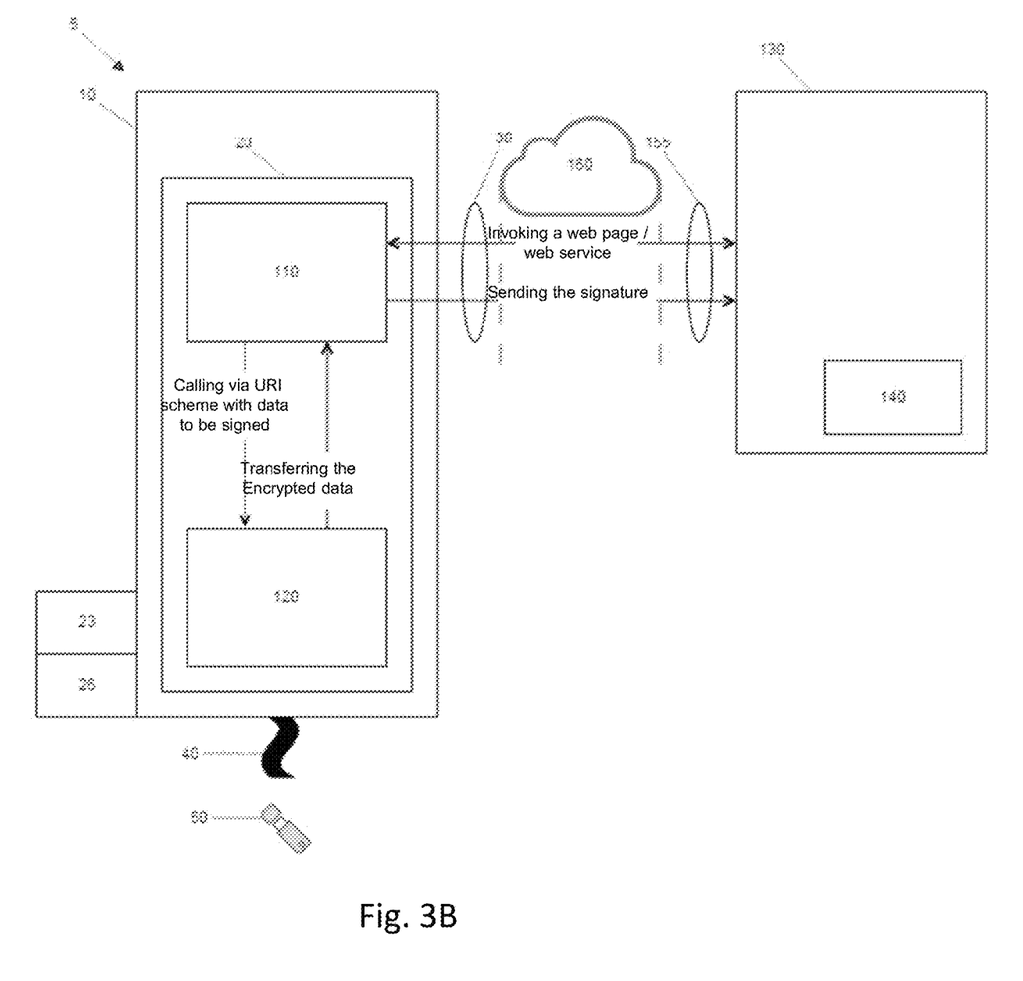
FIG. 3B shows schematically a system having an access to a security device with processing of data to be encrypted.

FIG. 3B shows a similar method as the one described in FIG. 3A. In this case, the data must be encrypted or decrypted. In this aspect, the communication component 120 accesses the security device 50 to perform the encryption/decryption process.

Figure 4:
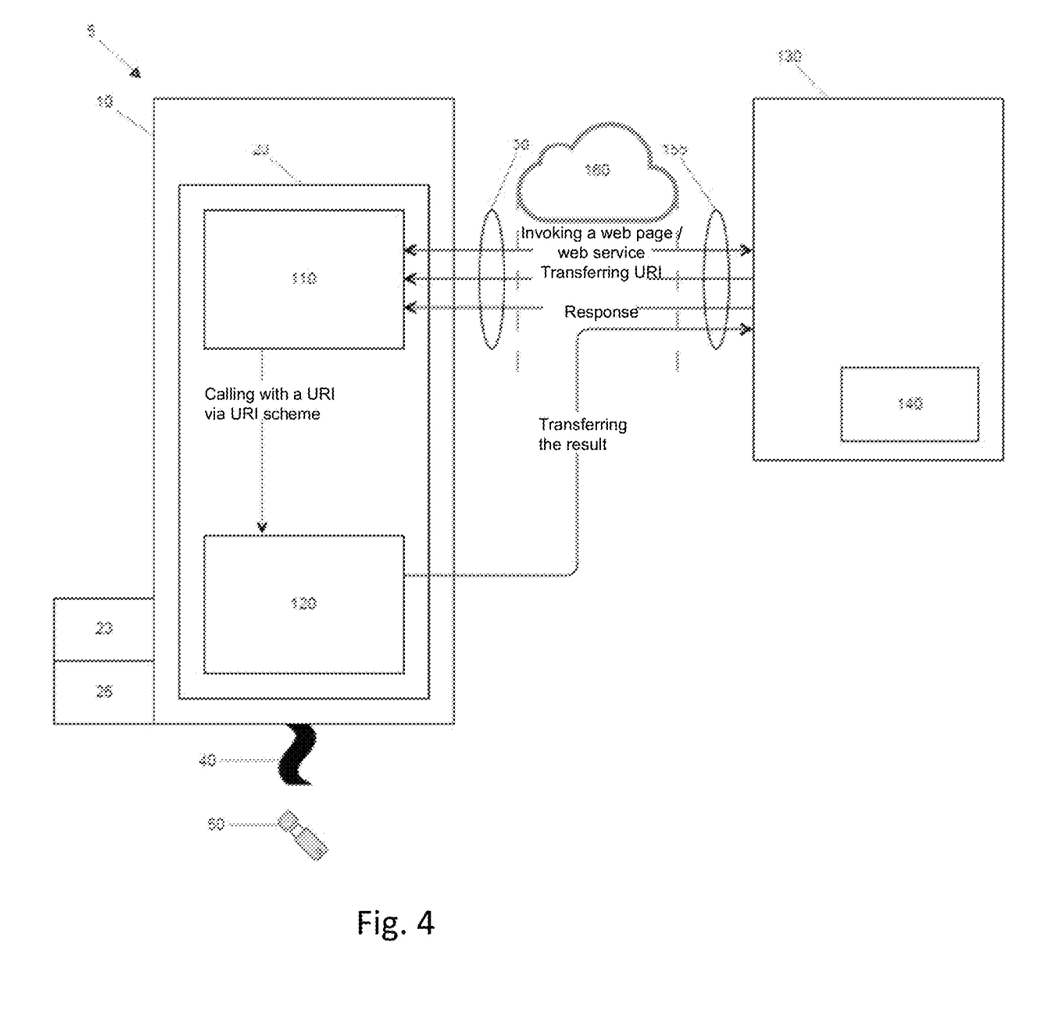
FIG. 4 shows schematically a system generating a URI on an external computer and transferring the URI to the local application.

FIG. 4 shows a similar behavior as the one described in FIG. 2. In this aspect, it is shown that the URI does not necessarily have to be generated by the local application 110 itself, but can also be generated on the external computer 130, for example, by the external application 140, and subsequently transferred to the local application 110.

Figure 5:
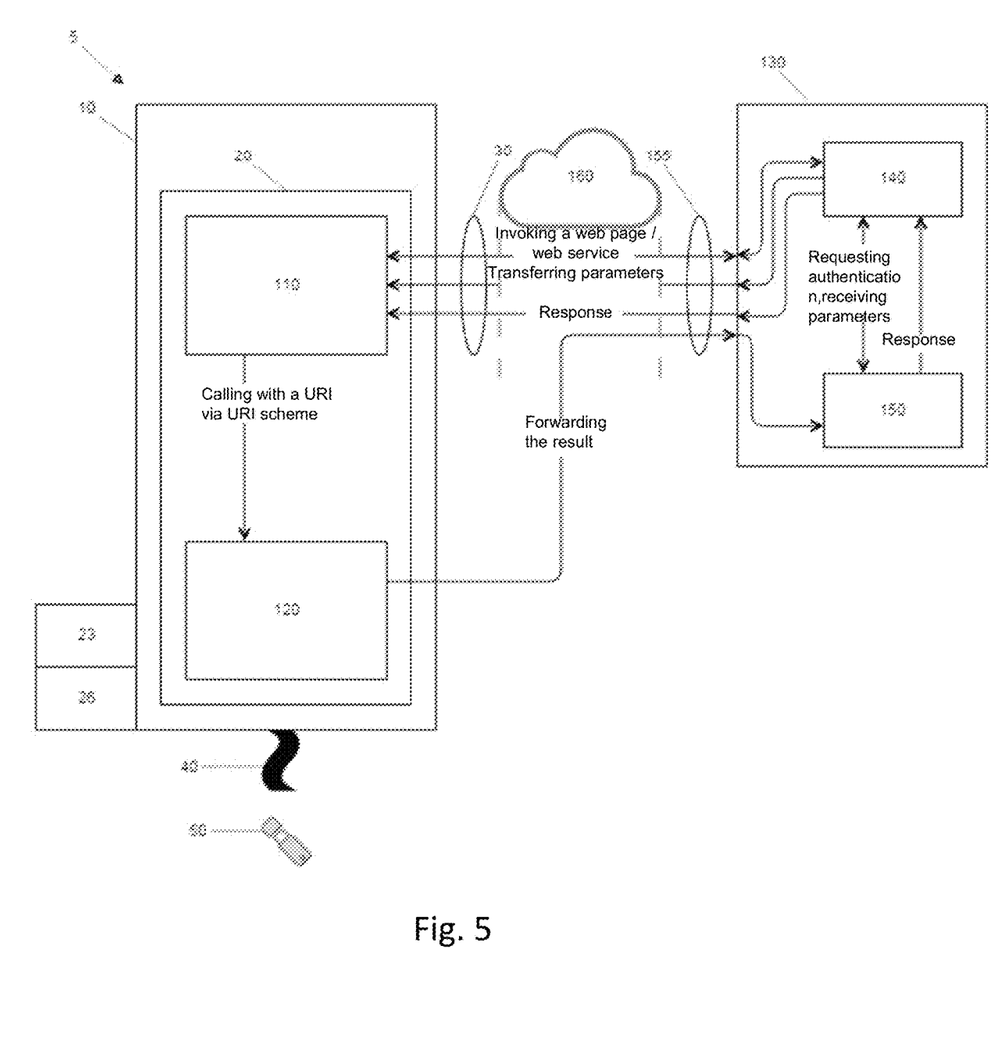
FIG. 5 shows schematically a system with subsequent processing on an external computer.

FIG. 5 shows another aspect of the method. This figure uses the same reference numerals as in the other figures for the same elements, but discloses more details on possible processing on the external computer 130.

On the external computer 130, not only does the external application 140 run, but also a management application 150 runs. The management application 150 is connected to the network 160 via a server interface 155. The external application 140 uses the management application 150 to perform the authentication.

The external application 140 requests an authentication from the management application 150 and receives the necessary parameters (e.g. a generated URI, a login page or forwarding to a login page) from this management application 150. The parameters are then transferred to the local application 110.

In addition, the management application 150 is addressed directly by the communication component 120 and receives the result sent by this communication component 120. After validation of the result by the management application 150, this management application 150 sends a response to the external application 140, which had previously started the authentication method.

This management application 150 may be a library, a proprietory application or a proprietory server. Multiple server interfaces 155 may also be provided that are used only with a limited number of applications to increase the security of the entire system.

REFERENCE NUMERALS

5 system
10 local unit
20 processor
23 graphics card
26 memory space
30 network interface
40 security interface
50 safety device
110 local application
120 communication component
130 external computer
140 external application
150 management application
155 server interface
160 network

The invention claimed is:

1. A method of using cryptography and authentication methods using a proprietary URI scheme, comprising:
   registering the proprietary URI scheme when activating or starting a local unit or when installing a local communication component;
   generating a URI with the registered proprietary URI scheme;
   calling a communication component using the generated URI and the registered proprietary URI scheme;
   performing one of the cryptography or the authentication method by the communications component; and
   generating at least one result by the communication component.

2. The method according to claim 1, further comprising: registering the registered proprietary URI scheme for calling the communication component.

3. The method according to claim 1, further comprising: access to a security device by the communication component.

4. The method according to claim 1, further comprising: polling an identifier by the communication component prior to performing the cryptography and authentication method.

5. The method according to claim 1, further comprising: generating the URI on an external computer and transferring the URI from the external computer to the local application prior to calling the communications component.

6. The method according to claim 1, further comprising: forwarding the generated result to the local application or to an external computer.

7. The method according to claim 1, further comprising: processing the generated result by a management application on the external computer.

8. The method according to claim 1, wherein the result of the communication component is a signature over data or is encrypted or decrypted data.

9. A local unit comprising:
   a hardware processor having a local application and a local communication component which registers a proprietary URI scheme, wherein the URI scheme is registered when activating or starting the local application or when installing the local communication component;
a network interface for connecting the local unit to an external computer, wherein the network interface transfers commands for starting an external application and receives parameters from the external application;
wherein the local application is configured to call the communication components via the self-registered proprietary URI scheme by means of a generated URI with the registered proprietary URI scheme; and
wherein the communication component is configured to establish a contact with a security device and to transfer a result to the external computer.

\* \* \* \* \*